United States Patent Office 3,274,052
Patented Sept. 20, 1966

3,274,052
PREPARATION OF PESTICIDE GRANULES
Jerome Yaffe, El Cerrito, and Robert E. Sellers, Fresno, Calif., assignors to FMC Corporation, New York, N.Y., a corporation of Delaware
No Drawing. Filed June 19, 1963, Ser. No. 288,895
21 Claims. (Cl. 167—42)

This invention relates to novel formulations for use in pest control, and particularly to new and improved granular formulations having enhanced utility, and to a novel method for preparing these formulations. This application is a continuation-in-part of co-pending application Serial No. 94,456, filed March 9, 1961, now abandoned.

The utility of granular formulations of pesticides, as compared with the dusts and sprays in which pesticides are conventionally formulated, has long been recognized. For example, the aerial drift of dusts or liquids of very fine particle size, distributed by aircraft or otherwise, it is controlled by the use of granular formulations free of these fine particles. However, difficulties atendant upon the preparation of stable granules which are uniform in size, in concentration, and in availability of active ingredient, have been compounded by even greater difficulties in providing such granules when a high concentration of active ingredient is required.

Thus, it is known to prepare granular pesticides by incorporating the toxicant into the carrier while forming or agglomerating the carrier into granules or pellets, thereby producing an intimate mixture of toxicant in carrier. These so-called agglomerated granules do not, however, have satisfactory uniformity, either in size or in concentration and availability of active ingredient, for most applications.

It is also known to prepare granular pesticides by dissolving solid toxicants with or diluting liquid toxicants in an appropriate solvent, then impregnating preformed granules with this solution. However, this process generally produces granules which vary greatly in strength, because of the necessarily high absorption characteristic of the granules. It is difficult by impregnation to obtain homogeneous distribution of toxicant among carrier particles, and the rate of release of the toxicant from such impregnated granules correspondingly varies with the degree of saturation of the individual particles of carrier with the toxicant. Further, impregnation techniques are limited to liquid or readily soluble toxicants which are compatible with the carrier, and applicable only with difficulty, if at all, to the preparation of granular formulations of most solid toxicants.

Because of the limited holding capacity of the granular cores available for impregnation, it is not possible to produce granules by the impregnation techniques at strengths significantly above 25%. It is known that when the holding capacity of granular cores is exceeded the resultant product tends to lump or become solid, and no longer retains desirable granular characteristics; nor can the product be restored to form granules. Although materials with very high holding capacity can be used to produce granules with strengths above 25%, these are either limited by economics, because of the high cost of the granular carrier, or result in a granular product from which the release is impeded.

Granular products have also been prepared by a process wherein inert granular cores are coated with a dust or powder of the toxicant. However, under practical conditions of handling and use a significant amount of the toxicant coating sloughs off the core before the locus of application is reached, with resultant losses of active material and inefficiency of operation, as well as the formation of dusts, which negates the safety features of granules.

Other methods of preparing granular pesticides have been described, but all have the disadvantage that either a significant portion of the toxicant does not achieve its maximum effectiveness, or that the amount of toxicant which is readily applied is limited.

Heretofore, no simple method has been available for the preparation of stable granules which can carry very high concentrations of solid toxicant, all of which toxicant may rapidly be released at the situs of application.

The primary object of the present invention is to provide granular materials containing a high concentration of toxic ingredients. Another object is to provide novel and versatile granular materials. Another object is to provide a new method for the preparation of improved granular pesticides. Another object is to provide high concentration granular pesticides characterized by uniformity in size and shape of the granular particles. Another object is to provide granular pesticides having a uniform high concentration of active ingredient among the individual granules. Another object is to provide granular pesticides from which the total amount of toxicant is readily released. Another object is to provide granular pesticides from which the toxicant may be released at a controlled rate and under controlled conditions. Another object is to provide granular pesticides which are dust free throughout handling and use. These and other objects, and attendant advantages, will become apparent from the following description of the invention.

We have discovered a new method for the preparation of granular pesticides from normally solid toxicants. By this process, granules containing a high concentration, at least 25% by weight, of toxicant may be prepared, including granules of concentration and compositions which were not heretofore available. A new form of coated granule is provided by the novel process of this invention, wherein a normally solid pesticide is sprayed in the molten state on the surface of a granular carrier; the normally solid toxicant is applied, in the desired concentration of at least 25% by weight of the granular carrier, at a temperature above the melting or softening point of the toxicant, while the granular carrier is maintained at a temperature below the temperature at which the molten toxicant solidifies. The toxicant solidifies or crystallizes on the granular base, forming a solid coating adherent to the surface of the granules. These high concentration granules are stable during handling and distribution, yet when the coated granules are contacted with water in the situs of application a high concentration of toxicant is released, in the form of very finely divided particles or crystals, in which form it functions more efficiently than in larger particles.

We have further discovered that the rate of release of the toxicant from the coated granule can be controlled, by appropriate selection of the granular core, by incorporating a wetting agent into the product, and/or by varying the conditions of preparing the coated granule. The process of this invention may be used to provide stable granular formulations, in concentrations of at least 25% by weight, of toxicants which heretofore could be formulated into granular form with difficulty or not at all, due to their insolubility in water or the common solvents used in standard impregnation procedures, or their inherent instability in the presence of certain core materials.

The coated granules produced herein are uniform in size, specific gravity, percentage of toxicant and rate of toxicant release. All of the toxicant may be completely released on contact of the granules with water, or the release can be controlled or delayed if desired. The granular products are stable, dry and free-flowing, and can contain a much higher concentration of toxicant than was previously available.

This invention provides for granular pesticides carrying high concentrations of virtually any toxicant material which is normally solid at temperatures of storage and use. From practical considerations, toxicants which melt above about 50° C. are generally preferred; however, lower melting toxicants may be used when it is known that the temperatures of storage and use will be relatively low. The toxicant may be any pesticide, including insecticides, fungicides, miticides, nematocides, rodenticides, piscicides, herbicides and other plant growth regulators, including systemic toxicants, and mixtures of these agents. The amount of active ingredient actually used may vary from 25 percent to as much as 85 percent by weight in the case of toxicants desired in such high concentration.

The granular core may be any water-insoluble or water-soluble, porous or non-porous material in the desired particle size range. These cores encompass a wide range of densities as well as particle size ranges, so that the granular pesticides may be tailored to specific end uses. Porous cores may be desired for their high surface area; but they are not required to provide coatings having a very high loading of toxicant. Where the core is a compound of nutritional value, such as a fertilizer, or is itself a toxicant, the granules may serve several purposes.

Typical soluble core materials useful in the practice of this invention include fertilizers such as ammonium phosphate, ammonium sulfate, urea, muriate of potash, superphosphate, combinations of these into mixed fertilizers, soluble herbicides such as sodium chlorate, and other soluble materials such as sodium sulfate. Typical insoluble core materials useful in the practice of this invention include granular forms of silica type materials such as sand, broken walnut hulls, argillaceous materials such as clay of the montmorillonite, kaolinite or other types, diatomaceous earths, vermiculite, perlite and other low density materials such as granulated corn cobs; soapstone, quartz, lead, iron, plastic beads and bubbles, and many other inert materials with a variety of densities and porosities. Other useful, relatively insoluble cores include agricultural minerals such as sulfur, gypsum, lime, calcium carbonate and the like.

Granular core materials having a particle size range of about 4 to 80 mesh may be used; that is, materials which will pass through a 4 mesh screen and be retained on an 80 mesh screen. The preferred range for most applications is 8 to 60 mesh. The particle size is of course slightly enlarged after the coatings are applied. The core may comprise about 15% to 75% by weight of the finished product, depending both on the specific gravity of the core and the amount of coating applied.

As an aid in controlling the rate of release of the toxicant from the core, it is usually preferred to incorporate a small proportion of an inert surface active agent into the granule. This is readily accomplished by mixing the granular core with the surface active agent before applying the molten toxicant. Surface active agents including wetting, emulsifying or dispersing agents, and hydrophilic and hydrophobic colloids, may be used, and may be of the anionic, cationic or nonionic types. Either liquid or solid agents may be employed. A useful listing of wetting agents is presented in the articles on "Synthetic Detergents" by John W. McCutcheon in the periodical, "Soap and Chemical Specialties," August, September and October 1949. Other surface active agents are well known in the art. The particular surface active agent used is readily determined from the nature of the granular system and the release characteristics desired: for example, cationic agents generally release the toxicant slower than do anionic or nonionic agents.

Sufficient surface active agent should be employed to achieve the desired release characteristics. Normally about 0.5 to 15% of agent, by weight of the final product, is used. For most agents, less than 0.5% of agent is relatively ineffective, and over 15% of agent is economically unattractive. It is usually preferred to employ about 1 to 5% of surface active agent, for good results. The surface active agent may be liquid, as previously stated, but is preferably applied as a finely divided solid. To facilitate dispersion the wetting agent may be mixed with a powdery extender, which may be any of the standard fillers, such as clay, diatomite, attapulgite, pyrophyllite, kaolite, montmorillonite, and the like, of a size to pass through a 200 mesh screen.

The granular products of this invention are readily prepared using standard equipment. A core material of the desired particle size range is placed in a mixing device, such as a rotating mill or cement mixer, or other device for mixing or rotating or otherwise dispersing the particles. Preferably although not necessarily while the core is in motion the surface active agent if used is introduced, and mixing is continued until the core particles and surface active agent are intimately mixed.

To the mixer or mill is next added the molten toxicant, as a spray of droplets, during mixing or tumbling of the core. The toxicant is preferably at a temperature slightly above its melting or softening point, and the core is at a lower temperature than the melting point of the toxicant. It is usually not necessary to heat the granular core, although with high melting toxicants it may be necessary to keep the atmosphere warm enough to avoid solidification of the toxicant before it reaches the tumbling granules. A uniform adherent coating is readily obtained, and the amount of toxicant on the core is readily controlled by the size, surface area and sorptive characteristics of the core particles, and the amount of toxicant charged. If desired, an inert extender may be mixed with the molten toxicant, which extender need not itself be molten. Mixtures of compatible toxicants may be used, both to lower the melting point of the mixture, and to provide multipurpose granules. If the toxicant is a high-melting material or one which melts with charring or which sublimes, a small amount of a liquid diluent may be used, to inhibit these phenomena. It is preferred to use no more than 10% of liquid for this purpose. Liquid diluents which boil near the melting points of the toxicant are preferred, so that the diluent may evaporate during the spraying of the toxicant. Should the liquid diluent be retained on the granule, the release characteristics of the toxicant may be affected—this is, in fact, another possible method of affecting the rate of release of the toxicant from the core—for example, melting the pesticide with a few percent of a partially water-soluble liquid diluent, such as isophorone or diethylene glycol, accelerates the release of the toxicant, whereas melting the pesticide in a water-insoluble liquid diluent such as methylated naphthalene lowers the rate of release. The pesticide may also be melted with a surface active agent, liquid or solid, before application to the core.

The molten toxicant, on contacting the core granules, forms a solid or crystalline coating on the surface of the core. The final product normally does not require drying, but many be dried, if necessary, by standard procedures, such as passing through a heated kiln. In some cases, the product may be chilled to aid in crystallization of the toxicant. Tumbling may be continued after all the toxicant is added, to promote crystallization and drying of the product. The final product is a dry, free flowing granule having a firmly adherent coating of toxicant, which coating is retained intact on the core throughout handling, packaging, shipping and final application, yet which is completely released from the core when contacted with water in the situs of use. This release from the granular core, in the finely divided form which is essential for effectiveness of a solid toxicant—generally well over 90% of the released toxicant passes through a 325 mesh screen—is a remarkable phenomenon in view of the process by which these granules are made.

This invention is illustrated further in the following examples, which present a number of specific embodiments of these granular formulations, as illustration rather than limitation of the practice and utility of this invention. All parts are by weight unless otherwise indicated.

*Example 1*

Four hundred and forty-five grams of attapulgite clay which had been screened to a 24 to 48 mesh size and 50 grams of sodium alkyl naphthalene sulfonate were charged to a rotating mill and tumbled until mixed. While rotating at room temperature, the mixture was slowly sprayed with 505 grams of molten technical grade DDT, a material containing dichlorodiphenyltrichloroethane, having a minimum setting point of 890° C. This material was maintained at a temperature of 105–115° C., and the spraying was carried out at the rate of 100 grams per minute. The product was a free-flowing granular insecticide, which contained no particles smaller than 40 mesh. When the product was placed in water the DDT was rapidly released, in the form of very small particles. Over 95% of the released DDT passed through a 325 mesh screen. When applied at the rate of four to six pounds per acre in rice fields, this product effectively controlled tadpole shrimp.

*Example 2*

Thirty-nine parts of diatomite of 14 to 30 mesh particle size was tumbled with 3.0 parts of finely divided silica for five minutes until thoroughly mixed. To 53.0 parts of technical grade aldrin (1,2,3,4,10,10-hexachloro-1,4,4-alpha,5,8,8 - alpha-hexahydro - 1,4-endo,exo-5,8 - dimethanonaphthalene) which contained at least 95 parts of aldrin was added 5.0 parts of a tertiary amine ethylene oxide condensate. This mixture was melted, and sprayed on the tumbling granules. The coated granules were dry and free flowing, and slowly released the entire toxicant on contact with water, in the form of very finely divided particles. This material is useful for the control of wireworms and other soil insects, at the rate of 6 to 12 pounds per acre.

*Example 3*

Thirty-nine and one half parts of attapulgite clay of 24 to 48 mesh particle size was mixed with 3.0 parts sodium alkyl naphthalene sulfonate in a cement mixer. During mixing, a molten solution of 50.5 parts technical grade dieldrin (1,2,3,4,10,10-hexachloro-6,7-epoxy-1,4,4 - alpha,5,6,7,8,8-alpha-octahydro-1,4 - endo,exo-5,8-dimethanonaphthalene), which grade contained over 85% dieldrin, in 7.0 parts isophorone, was sprayed at a temperature of 125–130° C. on the rotating granules. The dieldrin solidified on contact, forming a stable homogeneous coating on the granules which, after drying at 50° C. for 30 minutes, were free-flowing. On contact with water, all of the toxicant was rapidly released, in the form of finely divided particles. This product controls alfalfa weevil when applied on the soil at a rate of 8 to 12 pounds per acre.

*Example 4*

Sixty-nine and one half parts superphosphate (single) was tumbled in a ribbon mixer. Twenty-five and one half parts of technical grade isopropyl N-phenylcarbamate and 5.0 parts of an emulsifier blend comprising an alkyl aryl sulfonate and polyoxyethylene sorbitan esters of mixed fatty and resin acids was melted to 94° C. and sprayed on the tumbling granules. The isopropyl phenylcarbamate crystallized immediately on contact with the granules, to form a dry, free-flowing, homogeneous product. The granules released the toxicant coating on contact with water, to form a finely divided solid suspension. The product controls weedy grasses in Ladino clover when applied to the soil at the rate of 25 pounds per acre, and also provides fertilizer nutrients.

*Example 5*

In a rotating mill were mixed 68.50 parts sand of 20/28 mesh size, 5.00 parts of an alkyl naphthalene sodium sulfonate and 1.00 part urea. Melted together at 40° C. were 10.5 parts technical grade aldrin which contained 92% aldrin, and 15.00 parts technical grade heptachlor (1,4,5,6,7,8,8-alpha-heptachloro - 3-alpha,4,7,7-alpha-tetrahydro-4,7-endo-methanoindene), which contained 72% pure heptachlor. This molten mass was sprayed at 75° C. on the tumbling sand mixture, to produce a dry granular product, from which the toxicants were released on contact with water in very finely divided form. This product is used for the control of alfalfa weevil or soil insects at the rate of 15 to 30 pounds per acre.

*Example 6*

Eighteen parts of diatomite of 14 to 30 mesh particle size was tumbled in a ribbon mixer with 7.0 parts sodium alkyl naphthalene sulfonate. Seventy-five parts of technical grade DDT was melted at 115° C., and sprayed on the granules, while mixing was continued, over a period of 10 minutes. The product was a homogeneous, dry, free-flowing granule of good physical appearance. On contact with water, the DDT was released in the form of fine particles. This product, distributed by airplane at the rate of 3 to 4 pounds per acre, controls tadpole shrimp and mosquito larvae in rice fields or swampland.

*Example 7*

On 70.0 parts of bentonite (15/30 mesh) while tumbling was sprayed 30.0 parts of molten technical grade DDT at 110–115° C. The product was a dry, homogeneous granular which on contact with water released the DDT in colloidal particles. This product is useful to control mosquito larvae in swampland, applied at the rate of 10 pounds per acre.

*Example 8*

Forty-four parts of corn cob grits of 20/40 mesh size was mixed with 6.0 parts of a sulfated fatty ester liquid wetting agent. To this was added, while tumbling, 50.0 parts of molten technical DDT, at 115° C. The product was a dry, free-flowing, homogeneous granular, which on contact with water slowly released the DDT in very fine particles. This product is useful to control mosquito larvae and tadpole shrimp, applied at the rate of 4 to 6 pounds per acre.

*Example 9*

To 67.0 parts of rotating Olancha clay granules, a montmorillonite type clay, screened to 15/30 mesh size, was added a molten mixture of 25.5 parts technical Dicryl and 7.5 parts sodium N-methyl-N-palmitoylaurate at 150° C., for a spraying time of 2 minutes. The product was a homogenous, free-flowing granular herbicide which rapidly released the toxicant, on contact with water, in the form of very fine particles.

These granular pesticides may be distributed by standard airplane or ground equipment. In addition to conventional application against pests of all types, their novel construction makes these granulars particularly useful in many new applications, where pesticides had heretofore found limited utility due to inherent limitations of granular and other formulations previously available.

For example, it is often desired to control aquatic insects, weeds, fungi and undesirable fish. The specific gravity of these granules, and the rate of release of the toxicant, can be adjusted during their manufacture to provide surface, intermediate or bottom contact, and even penetration into bottom mud, to control the specific organism involved.

Again, it is recognized that crop refuse and rubbish dumps are ideal breeding places for pests especially after precipitation; the coated granules of this invention can be applied in advance of infestation with the assurance that their effectiveness will not be dissipated prematurely.

These granules are especially useful for the control of soil pests such as wireworms, soil maggots, soil fungi, weeds and weed seeds, etc. The granules can be broadcast on the soil, or worked into the soil, subsequently releasing the toxicant by natural or artificial irrigation. Since the granules do not drift or blow away during application, in contrast with pesticidal dusts or sprays, and since the time and rate of release of the toxicant can often be controlled, substantially more effective utilization of the toxic ingredient, with greater safety to man, animals and crops is obtained.

It is often desired to place a toxicant on the ground or in water covered by a plant growth or canopy such as weeds, row crops, orchards or forest trees. When granules prepared according to this invention are applied from above the plants, most of them will fall through the plant growth to the ground or water because of the density, size and shape of the granules, rather than be retained on the foliage as in the case of dusts or sprays. This results not only in more efficient use of the toxicant, but avoids the retention of undesirable or toxic residues on the plant growth.

A number of additional special applications become apparent, such as use of these granular formulations to control snow mosquitoes by applying the granular insecticide during the winter; as the snow melts in the spring the insecticide becomes available simultaneously with appearance of the mosquito larvae. Further, these granular materials can be readily dispersed in areas not easily accessible to standard spray or dust equipment, such as steep ditch or stream banks, around electric power poles, and along fences enclosing domestic animals or public places such as parks or playgrounds.

It will be apparent that this invention is susceptible to numerous modifications and variations of the practical and preferred embodiments described and exemplified herein, and it is intended to include such modifications and variations within the scope of the following claims.

We claim:

1. The process for preparing concentrated granular pesticides which comprises the step of coating the surface of granular carrier particles with toxicant, said toxicant comprising 25–85% by weight of the final product, by spraying molten droplets of a normally solid toxicant composition upon the surface of said granular carrier particles during said coating step, said particles being maintained in motion and at a temperature below the temperature at which the toxicant composition solidifies, whereby the molten toxicant solidifies on contact with the surface of the granular carrier particles and forms an adherent coating on the outer surface of said particles.

2. The process for preparing concentrated granular pesticides which comprises the step of coating the surface of granular carrier particles in the size range of 4–80 mesh and mixed with about 0.5–15% by weight of the final product of a surface active agent, with toxicant, said toxicant comprising about 25–85% by weight of the final product, by spraying molten droplets of a normally solid toxicant composition upon the surface of said granular carrier particles during said coating step, said particles being maintained in motion and at a temperature below the temperature at which the toxicant composition solidifies, whereby the molten toxicant solidifies on contact with the surface of the granular carrier particles and forms an adherent coating on the outer surface of said particles.

3. The process for preparing concentrated granular pesticides which comprises the step of coating the surface of granular carrier particles, in the size range of 8–60 mesh and mixed with about 1 to 5% by weight of the final product of a solid, powdery, surface-active composition, with toxicant, said toxicant comprising about 25–85% by weight of the final product, by spraying molten droplets of a normally solid toxicant composition upon the surface of said granular carrier particles during said coating step, said particles being maintained in motion and at a temperature below the temperature at which the toxicant composition solidifies, whereby the molten toxicant solidifies on contact with the surface of the granular carrier particles and forms an adherent coating on the outer surface of said particles.

4. The process for preparing concentrated granular pesticides which comprises the step of coating the surface of granular carrier particles with toxicant, said toxicant comprising about 25–85% by weight of the final product, by spraying molten droplets of a normally solid toxicant composition which contains not more than 10% by weight of a melting point depressant upon the surface of said granular carrier particles during said coating step, said particles being maintained in motion and at a temperature below the temperature at which the toxicant composition solidifies, whereby the molten toxicant solidifies on contact with the surface of the granular carrier particles and forms an adherent coating on the outer surface of said particles.

5. The process according to claim 4 wherein the melting point depressant has a high vapor-pressure, near the melting point temperature of the toxicant composition, and evaporates during the spraying and coating of the molten toxicant on the granular carrier particles.

6. The product of the process of claim 1.

7. The product of the process of claim 2.

8. The product of the process of claim 3.

9. The process of claim 4, wherein said melting point depressant is a surface active agent.

10. The process of claim 5, wherein the solid toxicant is melted in the presence of no more than 10%, by weight of toxicant, of a liquid diluent which boils near the melting point of the toxicant, whereby said liquid diluent evaporates during spraying of the molten toxicant on the granular carrier particles.

11. The process of claim 5, wherein said melting point depressant is isophorone.

12. The process of claim 5, wherein said melting point depressant is diethylene glycol.

13. The process of claim 1 wherein said granular carrier particles are attapulgite clay.

14. The process of claim 1, wherein said granular carrier particles are bentonite.

15. The process of claim 1, wherein said granular carrier particles are superphosphate.

16. The process of claim 1, wherein said granular carrier particles are sand.

17. The process of claim 1, where said toxicant is DDT.

18. The process of claim 1, where said toxicant is aldrin.

19. The process of claim 1, where said toxicant is dieldrin.

20. The process of claim 1, where said toxicant is isopropyl N-phenylcarbamate.

21. The process of claim 2, wherein said surface active agent is an anionic agent.

References Cited by the Examiner

UNITED STATES PATENTS

| | | | |
|---|---|---|---|
| 2,529,681 | 11/1950 | Flenner | 167—42 |
| 2,627,488 | 2/1953 | Zakheim | 167—42 |
| 2,731,337 | 1/1956 | Morill et al. | 71—2.4 |
| 2,739,053 | 3/1956 | Morill | 71—2.4 |
| 2,768,095 | 10/1956 | Tadema et al. | 167—42 |
| 3,028,305 | 4/1962 | Alvin et al. | 167—42 |

FOREIGN PATENTS 576,690  5/1959  Canada.

OTHER REFERENCES

Handbook of Aldrin, Dieldrin and Endrin Formulations, Shell Chemical Corp., Arg. Chem. Div., 460 Park Ave., New York 22, N.Y.; 2nd printing Dec. 1954, pp. 21–39. Pages relied on, 25–26.

JULIAN S. LEVITT, *Primary Examiner.*

S. J. FRIEDMAN, *Assistant Examiner.*

UNITED STATES PATENT OFFICE
CERTIFICATE OF CORRECTION

Patent No. 3,274,052

September 20, 1966

Jerome Yaffe et al.

It is hereby certified that error appears in the above numbered patent requiring correction and that the said Letters Patent should read as corrected below.

Column 1, line 20, for "it" read -- is --; line 22, for "atendant" read -- attendant --; line 54, for "techniques" read -- technique --; column 2, line 28, after "granules." insert -- Another object is to provide granular pesticides which release the active ingredient at a uniform rate among the individual granules. --; column 5, line 31, for "890°C" read 89°C --.

Signed and sealed this 29th day of August 1967.

(SEAL)

Attest:

ERNEST W. SWIDER
Attesting Officer

EDWARD J. BRENNER
Commissioner of Patents